United States Patent
Lin et al.

(10) Patent No.: US 8,743,061 B2
(45) Date of Patent: Jun. 3, 2014

(54) TOUCH SENSING METHOD AND ELECTRONIC DEVICE

(75) Inventors: Jao-Ching Lin, Taipei (TW); Abel Lin Chu, Taipei (TW); Wen-Ding Lee, Xizhi (TW); John Shen, Tainan (TW)

(73) Assignee: Touchscreen Gestures, LLC, Dallas, TX (US)

( * ) Notice: Subject to any disclaimer, the term of this patent is extended or adjusted under 35 U.S.C. 154(b) by 112 days.

(21) Appl. No.: 12/848,410

(22) Filed: Aug. 2, 2010

(65) Prior Publication Data

US 2011/0102339 A1 May 5, 2011

(30) Foreign Application Priority Data

Oct. 29, 2009 (TW) .............................. 98136660 A (51) Int. Cl.
*G06F 3/041* (2006.01)

(52) U.S. Cl.
USPC ..................... 345/173; 345/174; 178/18.06

(58) Field of Classification Search
USPC ......... 345/173–178; 178/18.01, 18.03, 18.06; 715/863
See application file for complete search history.

(56) References Cited

U.S. PATENT DOCUMENTS

| | | | | |
|---|---|---|---|---|
| 5,825,352 A * | 10/1998 | Bisset et al. | ............ | 345/173 |
| 7,202,858 B2 * | 4/2007 | DeGroot et al. | ............ | 345/173 |
| 7,703,976 B2 * | 4/2010 | Henshaw et al. | ............ | 374/179 |
| 8,059,872 B2 * | 11/2011 | Tazoe | ............ | 382/126 |
| 8,314,775 B2 * | 11/2012 | Westerman et al. | ............ | 345/173 |
| 2007/0279397 A1 * | 12/2007 | Cho et al. | ............ | 345/173 |
| 2008/0180402 A1 * | 7/2008 | Yoo et al. | ............ | 345/173 |
| 2010/0134425 A1 * | 6/2010 | Storrusten | ............ | 345/173 |
| 2010/0149110 A1 * | 6/2010 | Gray | ............ | 345/173 |

\* cited by examiner

*Primary Examiner* — Abbas Abdulselam
*Assistant Examiner* — Gerald Oliver
(74) *Attorney, Agent, or Firm* — Winston Hsu; Scott Margo (57) ABSTRACT

A touch sensing method includes: scanning a plurality of first and second sensor lines, aligned in two different directions, of a touch sensor board; generating first and second indications based on the scan result, the first/second indication carrying information of at least one group of the first/second sensor lines that are adjacent to one another on the touch sensor board and that have detected a user's touch on the touch sensor board and of a number of the first/second sensor lines in the group; and generating a status signal that corresponds to a predetermined finger gesture at least based on a comparison result determined by comparing the number of the first sensor lines indicated by the first indication with the number of the second sensor lines indicated by the second indication. An electronic device that implements the touch sensing method is also disclosed.

17 Claims, 6 Drawing Sheets

TOUCH SENSING METHOD AND ELECTRONIC DEVICE

CROSS-REFERENCE TO RELATED APPLICATION

This application claims priority of Taiwanese Application No. 098136660, filed on Oct. 29, 2009.

BACKGROUND OF THE INVENTION

1. Field of the Invention

This invention relates to a touch sensing method and an electronic device for detecting finger gestures of a user's fingers touching a touch sensor board of the electronic device.

2. Description of the Related Art

Touch sensor boards are becoming widely used in electronic devices, such as notebook computers, personal digital assistants (PDAs), portable electronic devices, touch remote controls, touch screens, and touch input pads, etc., to serve as input media. A new trend of the touch sensing technology is towards having a multi-finger gesture detecting ability.

U.S. Patent Publication No. 2009/0184934 discloses a conventional multi-finger touch sensing method for a touch sensor board including a plurality of first and second sensor lines. The first sensor lines and the second sensor lines are aligned in different directions. The touch sensing method includes: scanning the first and second sensor lines; finding at least one group of the first sensor lines that are adjacent to one another on the touch sensor board and that have detected a user's touch on the touch sensor board, and at least one group of the second sensor lines that are adjacent to one another on the touch sensor board and that have detected the user's touch on the touch sensor board; determining a number of fingers touching the touch sensor board based on a number of the groups of the first sensor lines and a number of the groups of the second sensor lines, where the number of the fingers touching the touch sensor board is one or greater; and determining a finger gesture performed using the determined number of the fingers touching the touch sensor board. For example, a vertical movement of two fingers on the touch sensor board may be defined as a scroll command.

The accuracy of determining the finger gesture performed using the determined number of the fingers touching the touch sensor board is significantly affected by the distance between each pair of adjacent fingers touching the touch sensor board. In other words, in order to determine the number of fingers touching the touch sensor board accurately, each pair of adjacent fingers touching the touch sensor board need to be opened to an extent sufficient to achieve accurate determination of a multi-finger gesture based on generated signals resulting from the touch on the touch sensor board. However, since the user does not know the minimum distance required between each pair of adjacent fingers in touching the touch sensor board, the accuracy of determining the finger gesture varies for different users. Furthermore, when the size of the touch sensor board is small, it is infeasible for the touch sensor board to be able to recognize a multi-finger gesture with at least three fingers in view of the fact that a sufficient width is required between each pair of adjacent fingers.

The conventional touch sensing method further determines whether each of the aforementioned groups of the first and second sensor lines corresponds to a one-finger touch or a multi-finger touch based on a comparison result determined by comparing a number of the scan lines of the group with a predetermined reference value, so as to determine the number of the fingers touching the touch sensor board more accurately. However, the comparison result is affected by the widths of user's fingers and the amount of charge built up in the user's body. For example, for a user with wide fingers or with a body that tends to carry a large amount of charge, the predetermined reference value must be increased accordingly, or the scan results of a one-finger touch can generate a larger number of the sensor lines that are adjacent to each other and that have detected the user's touch, which can lead to an erroneous determination of a multi-finger touch following a comparison with the predetermined reference value.

SUMMARY OF THE INVENTION

Therefore, the object of the present invention is to provide a touch sensing method and an electronic device that can overcome the aforesaid drawbacks associated with the prior art.

According to one aspect of this invention, there is provided a touch sensing method for a touch sensor board including a plurality of first and second sensor lines.

The first sensor lines and the second sensor lines are aligned in two different directions, respectively. The touch sensing method comprises: a) scanning the first and second sensor lines to generate scan results; b) generating first and second indications based on the scan results of step a), the first indication carrying information of at least one group of the first sensor lines that are adjacent to one another on the touch sensor board and that have detected a user's touch on the touch sensor board and of a number of the first sensor lines of the group, the second indication carrying information of at least one group of the second sensor lines that are adjacent to one another on the touch sensor board and that have detected the user's touch on the touch sensor board and of a number of the second sensor lines of the group; and c) generating a status signal that corresponds to a predetermined finger gesture at least based on a comparison result determined by comparing the number of the first sensor lines indicated by the first indication with the number of the second sensor lines indicated by the second indication.

According to another aspect of this invention, there is provided an electronic device that comprises a touch sensor board, a scanning circuit and an analyzing unit. The touch sensor board includes a plurality of first and second sensor lines. The first sensor lines and the second sensor lines are aligned in two different directions, respectively. The scanning circuit is coupled electrically to the touch sensor board and is configured to scan the first and second sensor lines to generate scan results. The analyzing unit is configured to generate first and second indications based on the scan results of the scanning circuit. The first indication carries information of at least one group of the first sensor lines that are adjacent to one another on the touch sensor board and that have detected a user's touch on the touch sensor board and of a number of the first sensor lines of the group. The second indication carries information of at least one group of the second sensor lines that are adjacent to one another on the touch sensor board and that have detected the user's touch on the touch sensor board and of a number of the second sensor lines of the group. The analyzing unit is further configured to generate a status signal that corresponds to a predetermined finger gesture at least based on a comparison result determined by comparing the number of the first sensor lines indicated by the first indication with the number of the second sensor lines indicated by the second indication.

BRIEF DESCRIPTION OF THE DRAWING

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
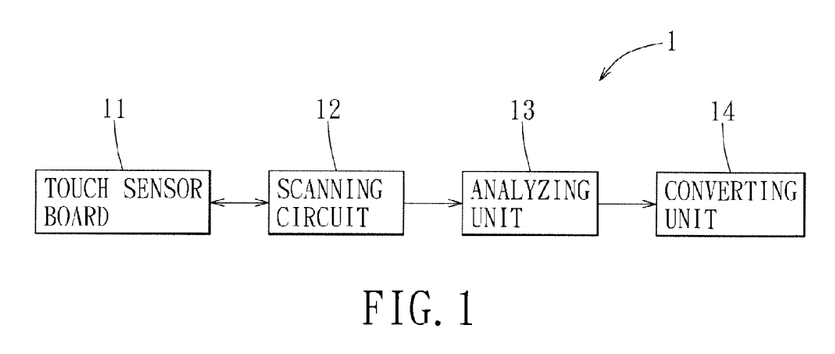
FIG. 1 is a block diagram of the preferred embodiment of an electronic device according to this invention.
Figure 2:
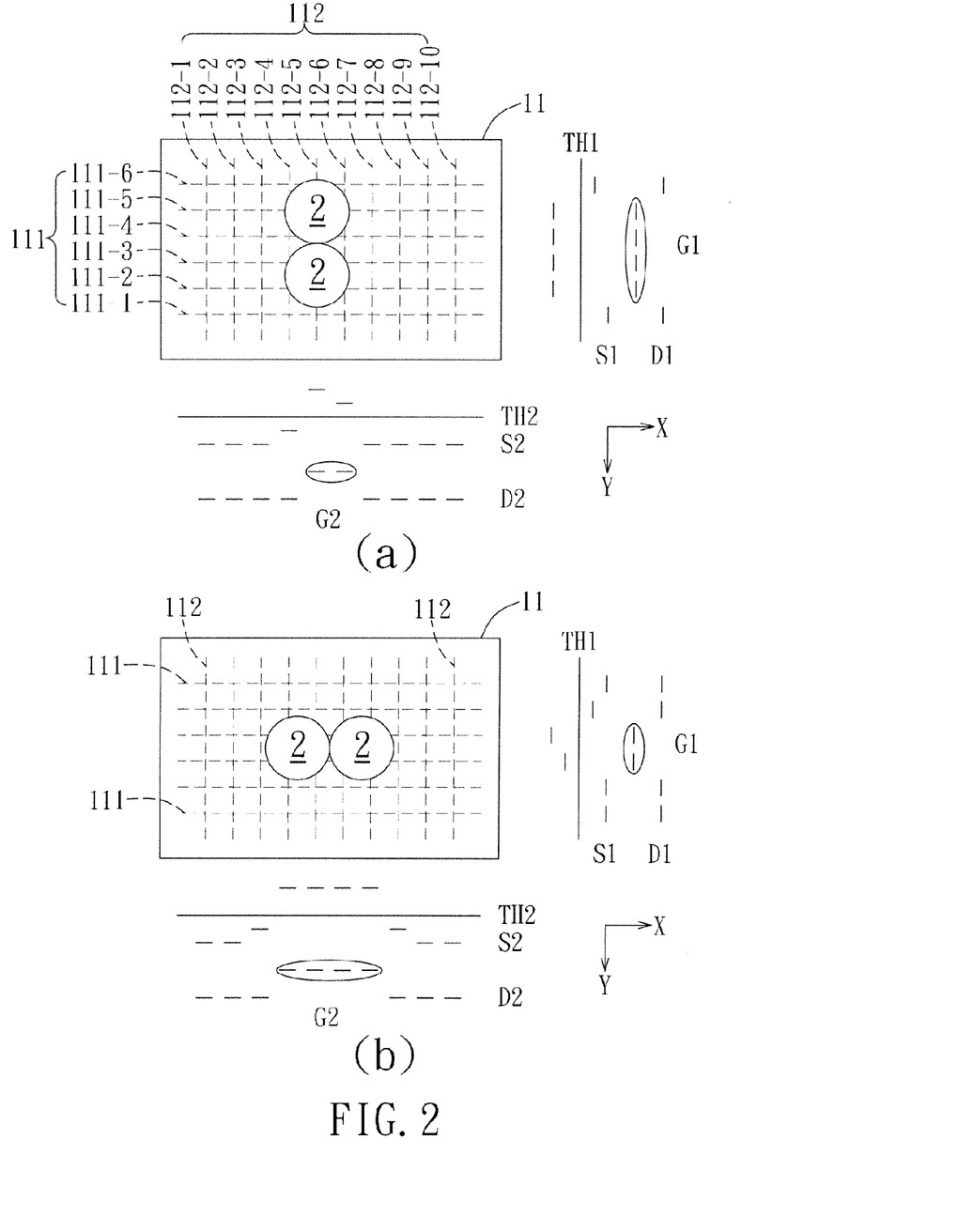
FIG. 2 is a schematic view illustrating (a) a first finger gesture and (b) a second finger gesture.

Referring to FIGS. 1 and 2, the preferred embodiment of an electronic device 1 according to this invention includes a touch sensor board 11 (FIG. 2 illustrates (a) a state where the touch sensor board 11 is being subjected to a first gesture touch and (b) a state where the touch sensor board 11 is being subjected to a second gesture touch), a scanning circuit 12, an analyzing unit 13 and a converting unit 14. The touch sensor board 11 is a capacitive touch sensor board, and includes a plurality of first sensor lines 111 aligned in a first direction (Y) and a plurality of second sensor lines 112 aligned in a second direction (X) different from the first direction (Y). In this embodiment, the first direction (Y) is a column direction, and the second direction (X) is a row direction. The scanning circuit 12 is coupled electrically to the touch sensor board 11.

Figure 3:
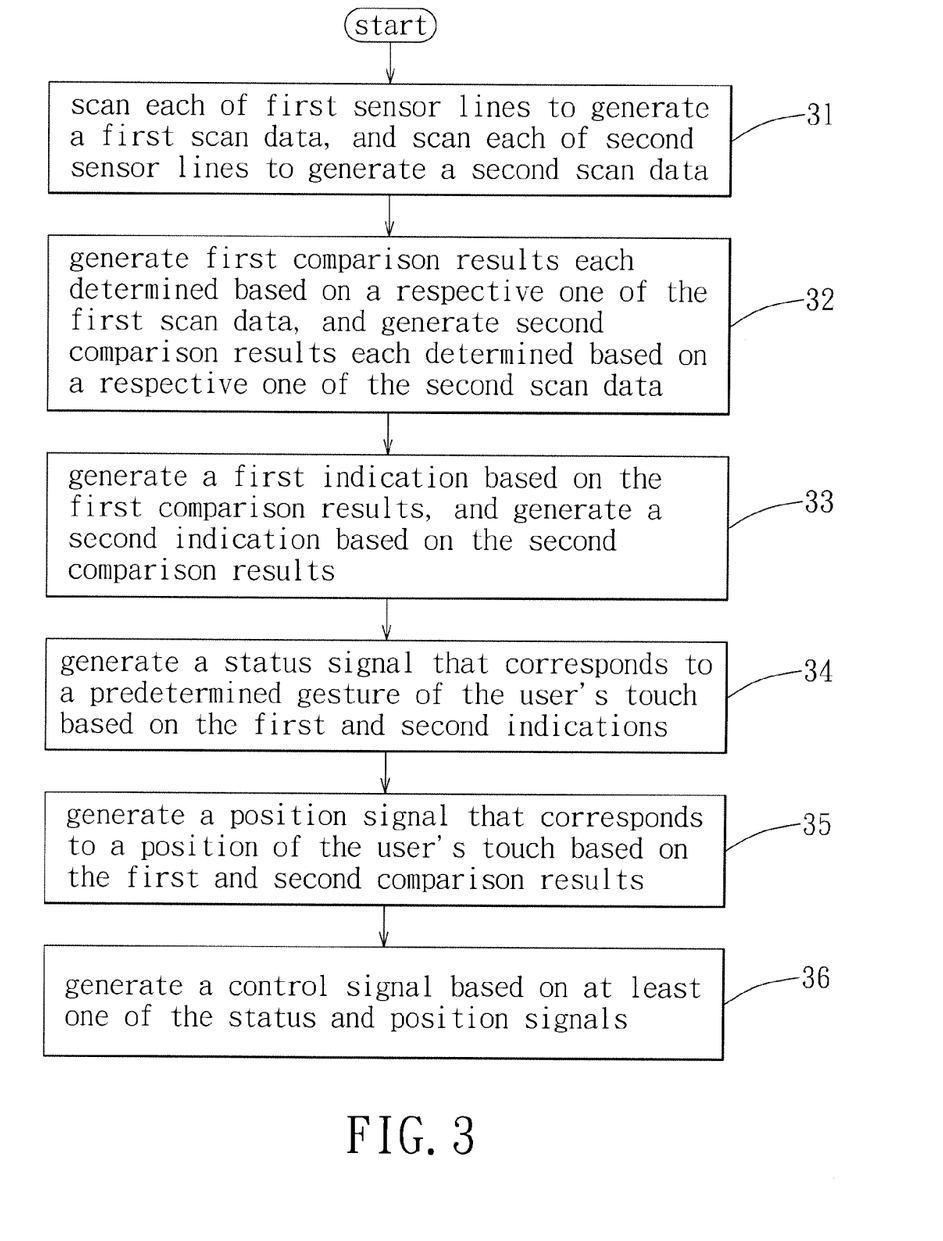
FIG. 3 is a flowchart illustrating steps involved in a touch sensing method according to a preferred embodiment of the present invention.

Referring to FIG. 3, in combination with FIGS. 1 and 2, a touch sensing method implemented in the electronic device 1 for detecting finger gestures of a user's fingers touching the touch sensor board 11 of the electronic device 1 includes and repeats the steps as outlined below.

In step 31, the scanning circuit 12 is configured to scan each of the first sensor lines 111 to generate a first scan data (S1) corresponding to a capacitance measured at each of the first sensor lines 111, and to scan each of the second sensor lines 112 to generate a second scan data (S2) corresponding to a capacitance measured at each of the second sensor lines 112.

In step 32, the analyzing unit 13 is configured to generate a plurality of first comparison results (D1) each indicating whether a respective one of the first sensor lines 111 is touched and each determined based on a respective one of the first scan data (S1), and to generate a plurality of second comparison results (D2) each indicating whether a respective one of the second sensor lines 112 is touched and each determined based on a respective one of the second scan data (S2).

In this embodiment, each of the first comparison results (D1) is determined by comparing the respective one of the first scan data (S1) with a predetermined first threshold value (TH1), and each of the second comparison results (D2) is determined by comparing the respective one of the second scan data (S2) with a predetermined second threshold value (TH2). The first and second threshold values (TH1, TH2) maybe the same, or different, depending on the sensitivities of the first and second sensor lines 111, 112. When the first scan data (S1) is greater than the first threshold value (TH1), the first comparison result (D1) is set to logic "1" representing the first sensor line 111 is touched, and when the first scan data (S1) is less than the first threshold value (TH1), the first comparison result (D1) is set to logic "0" representing the first sensor line 111 is not touched. For example, the first comparison results (D1) of the first gesture touch shown in FIG. 2(a) show that the first scan lines 111-2~111-5 are touched, and that the first scan lines 111-1, 111-6 are not touched. When the second scan data (S2) is greater than the second threshold value (TH2), the second comparison result (D2) is set to logic "1" representing the second sensor line 112 is touched, and when the second scan data (S2) is less than the second threshold value (TH2), the second comparison result (D2) is set to logic "0" representing the second sensor line 112 is not touched. For example, the second comparison results (D2) of the first gesture touch shown in FIG. 2(a) show that the second scan lines 112-5, 112-6 are touched, and that the second scan lines 112-1~112-4, 112-7~112-10 are not touched. In another embodiment, each of the first and second comparison results (D1, D2) is determined by comparing the respective one of the first and second scan data (S1, S2) with a predetermined threshold value (TH).

In step 33, the analyzing unit 13 is further configured to generate a first indication based on the first comparison results (D1), and to generate a second indication based on the second comparison results (D2). The first indication carries information of at least one group of the first sensor lines 111 that are adjacent to one another on the touch sensor board 11 and that have detected the user's touch on the touch sensor board 11 and of a number of the first sensor lines 111 of the group. The second indication carries information of at least one group of the second sensor lines 112 that are adjacent to one another on the touch sensor board 11 and that have detected the user's touch on the touch sensor board 11 and of a number of the second sensor lines 112 of the group.

For example, the first indication of the first gesture touch shown in FIG. 2(a) indicates that there is only one group (G1) of the first sensor lines 111-2~111-5 which are adjacent to one another on the touch sensor board 11 and which have detected the user's touch and that the number of the first sensor lines 111 of the group (G1) is four, and the second indication of the first gesture touch shown in FIG. 2(a) indicates that there is only one group (G2) of the second sensor lines 112-5, 112-6 which are adjacent to one another on the touch sensor board 11 and which have detected the user's touch and that the number of the second sensor lines 112 of the croup (G2) is two.

In step 34, the analyzing unit 13 is further configured to generate a status signal that corresponds to a predetermined finger gesture, based on the first and second indications.

For example, as shown in FIG. 2(a), if the first indication indicates that there is only one group (G1), the second indication indicates that there is only one group (G2), the number of the first sensor lines 111 indicated by the first indication is different from the number of the second sensor lines 112 indicated by the second indication, and the ratio of the number of the first sensor lines 111 indicated by the first indication to the number of the second sensor lines 112 indicated by the second indication is within a predetermined range, such as 1.5~2.5, then the status signal corresponding to the first finger gesture is thereby generated by the analyzing unit 13. Referring again to FIG. 2(a), the form of the first gesture touch involves the use of two fingertips 2 placed closely to each other and aligned in the first direction (Y). Alternatively, the same result can be achieved by using knuckles of two fingers or using entire end parts of two fingers.

As shown in FIG. 2(b), if the first indication indicates that there is only one group (G1), the second indication indicates that there is only one group (G2), the number of the first sensor lines 111 indicated by the first indication is different from the number of the second sensor lines 112 indicated by the second indication, and the ratio of the number of the second sensor lines 112 indicated by the second indication to the number of the first sensor lines 111 indicated by the first indication is within the predetermined range, i.e., 1.5~2.5, then the status signal corresponding to the second finger gesture is thereby generated by the analyzing unit 13. Referring again to FIG. 2(*b*), the form of the second gesture touch involves the use of two fingertips 2 placed closely to each other and aligned in the second direction (X).

Figure 4:
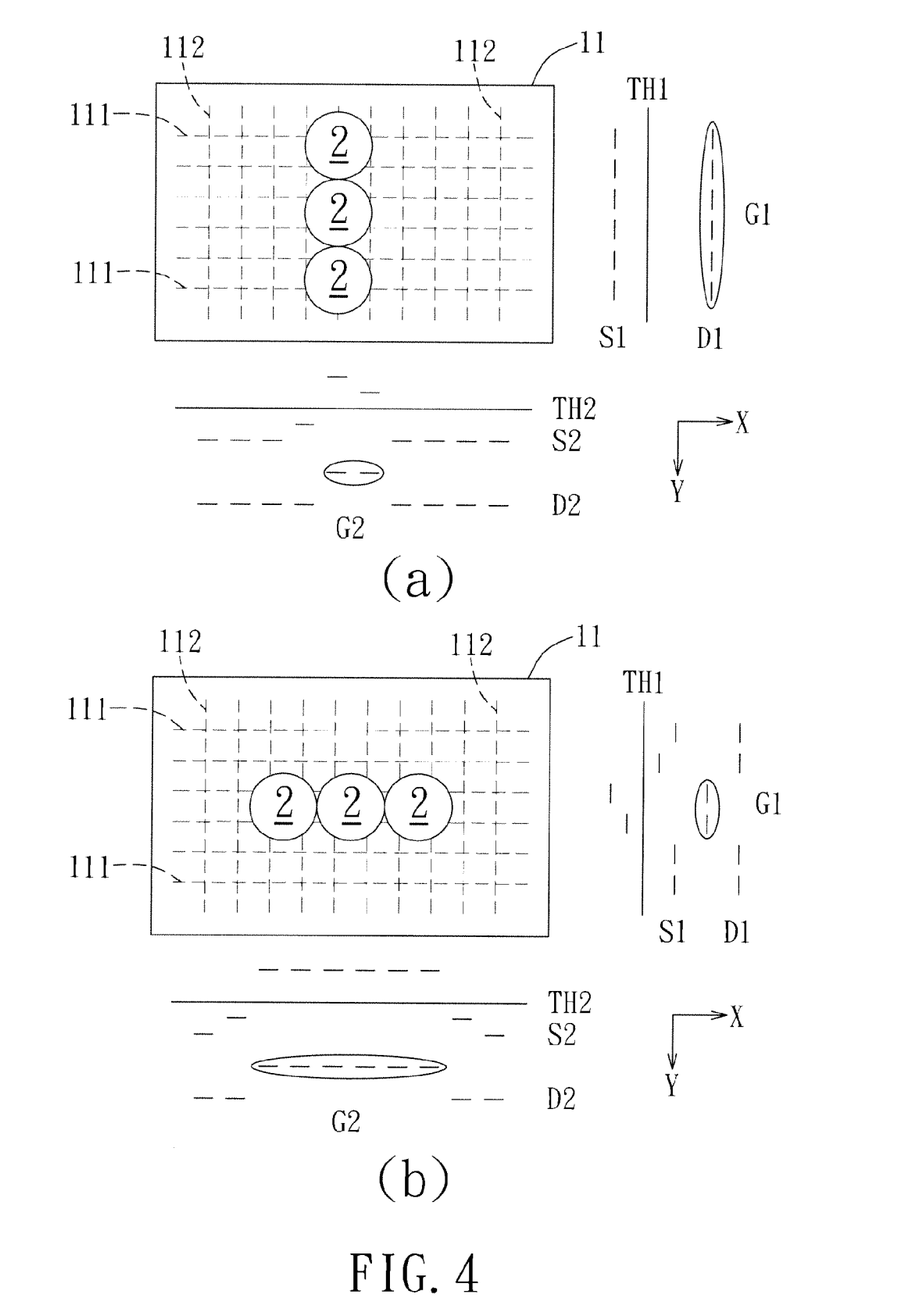
FIG. 4 is a schematic view illustrating (a) a third finger gesture and (b) a fourth finger gesture.

As shown in FIG. 4(*a*), if the first indication indicates that there is only one group (G1), the second indication indicates that there is only one group (G2), the number of the first sensor lines 111 indicated by the first indication is different from the number of the second sensor lines 112 indicated by the second indication, and the ratio of the number of the first sensor lines 111 indicated by the first indication to the number of the second sensor lines 112 indicated by the second indication is greater than an upper limit of the predetermined range, i.e., 2.5, then the status signal corresponding to a third finger gesture is thereby generated by the analyzing unit 13. Referring again to FIG. 4(*a*), the form of the third gesture touch involves the use of three fingertips 2 placed closely to one another and aligned in the first direction (Y).

As shown in FIG. 4(*b*), if the first indication indicates that there is only one group (G1), the second indication indicates that there is only one group (G2), the number of the first sensor lines 111 indicated by the first indication is different from the number of the second sensor lines 112 indicated by the second indication, and the ratio of the number of the second sensor lines 112 indicated by the second indication to the number of the first sensor lines 111 indicated by the first indication is greater than the upper limit of the predetermined range, i.e., 2.5, then the status signal corresponding to a fourth finger gesture is thereby generated by the analyzing unit 13. Referring again to FIG. 4(*b*), the form of the fourth gesture touch involves the use of three fingertips 2 placed closely to one another and aligned in the second direction (X).

Figure 5:
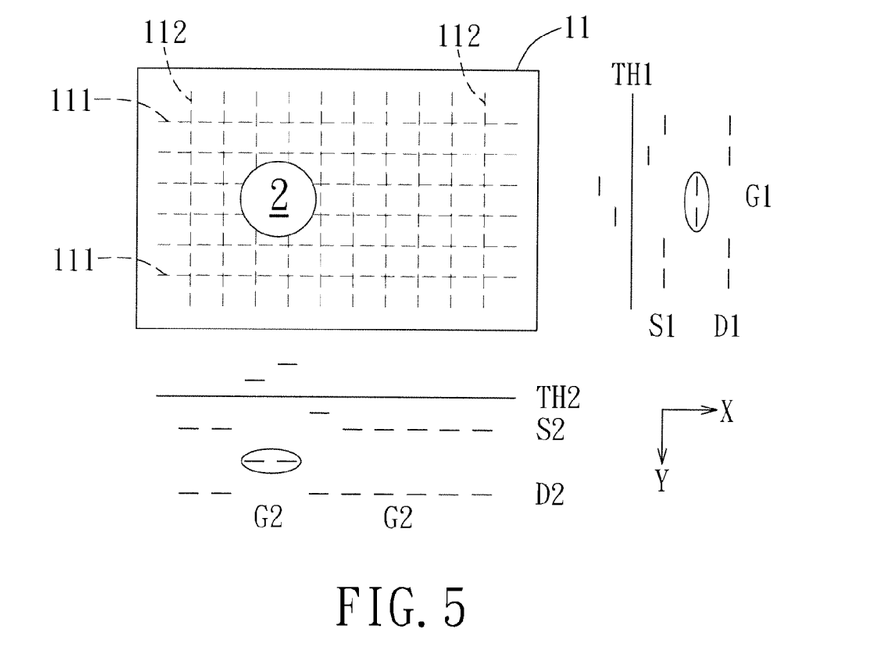
FIG. 5 is a schematic view illustrating a fifth finger gesture.

As shown in FIG. 5, if the first indication indicates that there is only one group (G1), the second indication indicates that there is only one group (G2), the ratio of the number of the first sensor lines 111 indicated by the first indication to the number of the second sensor lines 112 indicated by the second indication is less than a lower limit of the predetermined range, i.e., 1.5, and the ratio of the number of the second sensor lines 112 indicated by the second indication to the number of the first sensor lines 111 indicated by the first indication is less than the lower limit of the predetermined range, i.e., 1.5, then the status signal corresponding to a fifth finger gesture is thereby generated by the analyzing unit 13. Referring again to FIG. 5, the form of the fifth gesture touch involves the use of one fingertip 2.

Figure 6:
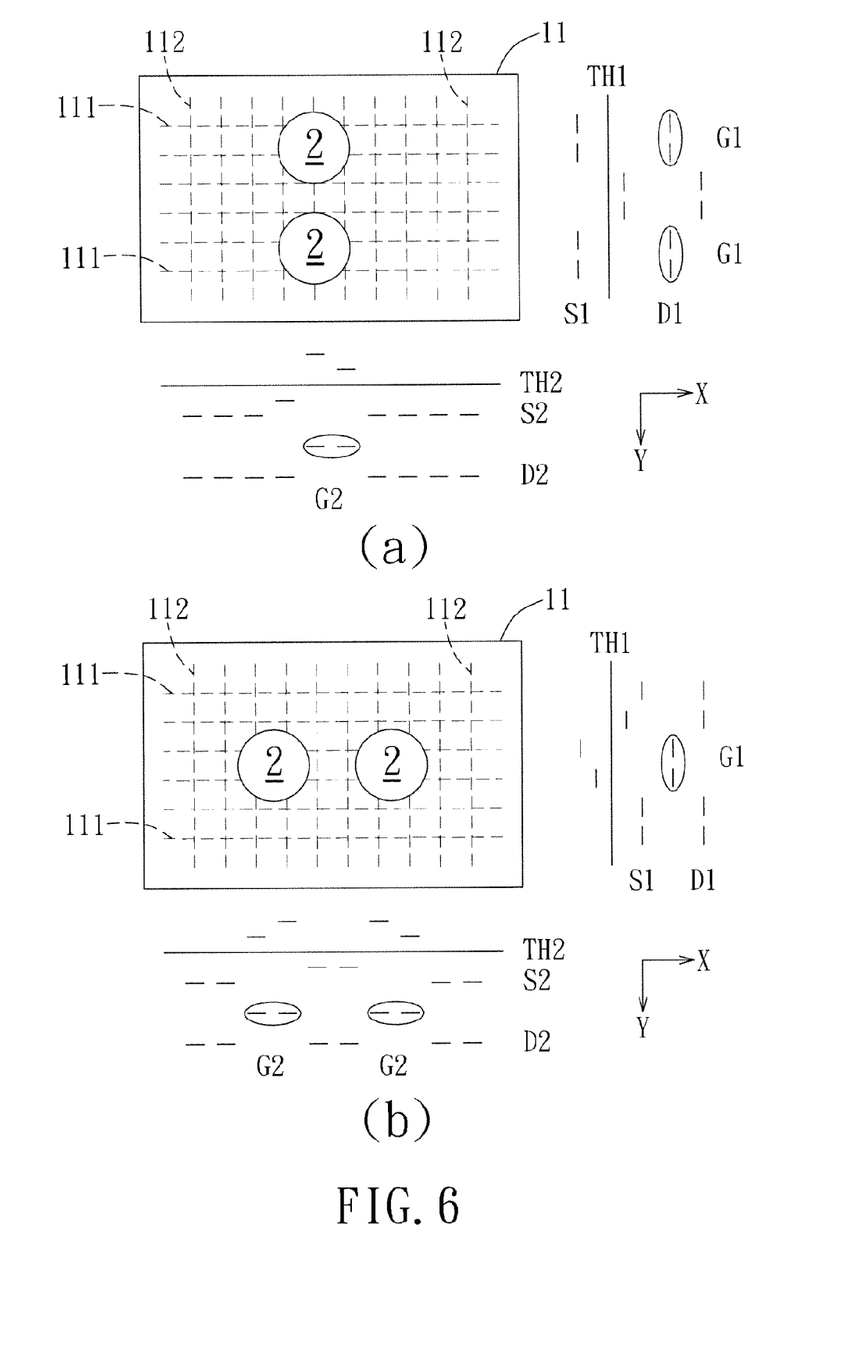
FIG. 6 is a schematic view illustrating (a) a sixth finger gesture and (b) a seventh finger gesture.

As shown in FIG. 6(*a*), if the first indication indicates that there are two groups (G1), and the second indication indicates that there is only one group (G2), then the status signal corresponding to a sixth finger gesture is thereby generated by the analyzing unit 13. Referring again to FIG. 6(*a*), the form of the sixth gesture touch involves the use of two fingertips 2 placed distant from each other and aligned in the first direction (Y).

As shown in FIG. 6(*b*), if the first indication indicates that there is only one group (G1), and the second indication indicates that there are two groups (G2), then the status signal corresponding to a seventh finger gesture is thereby generated by the analyzing unit 13. Referring again to FIG. 6(*b*), the form of the sixth gesture touch involves the use of two fingertips 2 placed distant from each other and aligned in the second direction (X).

In step 35, the analyzing unit 13 is further configured to generate a position signal, that corresponds to a position of the user's touch, based on the first and second comparison results (D1, D2).

By repeating step 31 to step 35, a sequence of status signals and a sequence of position signals are thereby generated.

In step 36, the converting unit 14 is configured to generate a control signal based on at least one of the status and position signals.

For example, the control signal thus generated can comply with a communication protocol used by a mouse to communicate with a host, i.e., the control signal can activate the same function as that of the output signal of the mouse for communicating with the host. It is known in the art that the functions to operate a cursor on a display can be activated by the motion of the mouse, the action of pressing or releasing a left button of the mouse, the action of pressing or releasing a right button of the mouse, and the action of rolling a scroll wheel of the mouse, respectively. In this embodiment, the status signal can be converted directly into the control signal, or a comparison result determined by comparing with one another at least two consecutive ones of the status signals can be directly converted into the control signal, without further calculation.

The following are examples illustrating how the control signals for different finger gestures or different combinations of the finger gestures can be used to activate functions as those of the mouse. Assuming that the fifth finger gesture shown in FIG. 5 corresponds to the motion of the mouse, that the first finger gesture shown in FIG. 2(*a*) corresponds to the pressing action of the left button, that the seventh finger gesture shown in FIG. 6(*b*) corresponds to the pressing action of the right button, and that the second finger gesture shown in FIG. 2(*b*) corresponds to the rolling action of the scroll wheel, then the converting unit 14 can be configured to output a control signal to activate a function corresponding to the motion of the cursor, a moving trace of which is determined from a moving trace of the finger 2 determined based on consecutive ones of the position signals, when all of consecutive ones of the status signals are of a type of the fifth finger gesture shown in FIG. 5, to output a control signal to activate a function corresponding to the pressing action of the left button when all of consecutive ones of the status signals are of a type of the first finger gesture shown in FIG. 2(*a*), to output a control signal to activate a function corresponding to the releasing action of the left button when two consecutive ones of the status signals are in a relation indicating a change form the first finger gesture shown in FIG. 2(*a*) to the fifth finger gesture shown in FIG. 5, to output a control signal to activate a function corresponding to the pressing action of the right button when all of consecutive ones of the status signals are of a type of the seventh finger gesture shown in FIG. 6(*b*), to output a control signal to activate a function corresponding to the releasing action of the right button when two consecutive ones of the status signals are in a relation indicating a change form the seventh finger gesture shown in FIG. 6(*b*) to the fifth finger gesture shown in FIG. 5, and to output a control signal to activate a function corresponding to the rolling action of the scroll wheel when all of consecutive ones of the status signals are of a type of the second finger gesture shown in FIG. 2(*b*), where the rolling action involves a scrolling direction and a scrolling speed determined from a moving direction and a moving speed of the fingers which are determined based on consecutive ones of the position signals.

Furthermore, the converting unit 14 can be further configured to generate a control signal for activating a specific function in response to one or a combination of the aforementioned gesture touches. For example, the first finger gesture shown in FIG. 2(a) can be used for generating a control signal for activating a drag function, and the moving trace of the fingers on the touch sensor board 11 can be converted into a moving trace of the dragging action. The second finger gesture shown in FIG. 2(b) can be used for generating a control signal for activating a scrolling function, and the moving trace of the fingers on the touch sensor board 11 can be converted into a direction and a speed of the scrolling action. The third finger gesture shown in FIG. 4(a) can be used for generating a control signal for activating a page up/down function, where a right movement of the fingers on the touch sensor board 11 can be used for activating the page down function, while a left movement of the fingers on the touch sensor board 11 can be used for activating the page up function. The fourth finger gesture shown in FIG. 4(b) can be used for generating a control signal for activating a select function.

In addition, the change of two consecutive ones of the status signals from the fifth finger gesture shown in FIG. 5 to another finger gesture can be used for generating a control signal for activating a function of pressing a virtual button, and a reverse change can be used for generating a control signal for activating a function of releasing the virtual button. The change of two consecutive ones of the status signals from the first finger gesture shown in FIG. 2(a) to the second finger gesture shown in FIG. 2(b) can be used for generating a control signal for activating a function of clockwise rotation of a virtual knob, and a reverse change can be used for generating a control signal for activating a function of counter-clockwise rotation of the virtual knob. The change of two consecutive ones of the status signals from the sixth finger gesture shown in FIG. 6(a) to the first finger gesture shown in FIG. 2(a), or from the seventh finger gesture shown in FIG. 6(b) to the second finger gesture shown in FIG. 2(b), can be used for generating a control signal for activating a function of zoom out of a virtual block, and a reverse change can be used for generating a control signal for activating a function of zoom in of the virtual block.

Furthermore, a change from a two-finger touch to a three-finger touch can be determined from the change of two consecutive ones of the status signals from the first finger gesture shown in FIG. 2(a) to the third finger gesture shown in FIG. 4(a), or from the second finger gesture shown in FIG. 2(b) to the fourth finger gesture shown in FIG. 4(b). If the first finger gesture shown in FIG. 2(a) is used for generating a control signal for activating a specific function, then the change of two consecutive ones of the status signals from the first finger gesture shown in FIG. 2(a) to the third finger gesture shown in FIG. 4(a) can be used for generating a control signal for activating a parameter control of the specific function. For example, if the first finger gesture shown in FIG. 2(a) is used for generating a control signal for activating a function of playing audio tracks, then the change of two consecutive ones of the status signals from the first finger gesture shown in FIG. 2(a) to the third finger gesture shown in FIG. 4(a) can be used for generating a control signal for activating a function of forwarding to the next audio track.

In application, the electronic device 1 can be a notebook computer, and the analyzing unit 13 and the converting unit 14 are implemented in software, or the electronic device 1 can be a touch sensing device coupled electrically to a host, and the analyzing unit 13 and the converting unit 14 are implemented in hardware or firmware.

In sum, by comparing the number of the first sensor lines 111 indicated by the first indication with the number of the second sensor lines 112 indicated by the second indication, and by generating the status signal based on whether the ratio of the two numbers is within a predetermined range when the comparison result shows that the two numbers are not equal in the touch sensing method of this invention, it becomes unnecessary to calculate the number of the fingers that touch the touch sensor board as in the case of the conventional touch sensing method, and the aforementioned drawbacks attributed to wide fingers of the user and the amount of charge built up in the user's body can be alleviated to increase the accuracy of determining the status signal that corresponds to the predetermined finger gesture.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A touch sensing method for a touch sensor board including a plurality of first and second sensor lines, the first sensor lines and the second sensor lines being aligned in two different directions, respectively, said touch sensing method comprising:
   a) scanning the first and second sensor lines to generate scan results;
   b) generating first and second indications based on the scan results of step a), wherein the first indication carries information of at least one group of the first sensor lines and an amount of the first sensor lines of the group, which are adjacent to one another and have detected a user's touch on the touch sensor board, and the second indication carries information of at least one group of the second sensor lines and an amount of the second sensor lines of the group, which are adjacent to one another and have detected the user's touch on the touch sensor board; and
   c) generating a status signal that corresponds to a predetermined finger gesture, which at least based on a comparison result determined by comparing the amount of the first sensor lines adjacent to one another detected simultaneously as indicated by the first indication with the amount of the second sensor lines adjacent to one another detected simultaneously as indicated by the second indication.

2. The touch sensing method of claim 1, wherein in step c), the status signal is generated further based on a ratio of the number of the first sensor lines adjacent to one another detected simultaneously as indicated by the first indication to the number of the second sensor lines adjacent to one another detected simultaneously as indicated by the second indication when the comparison result shows that the two numbers are not equal.

3. The touch sensing method of claim 2, wherein in step c), the status signal is generated based on whether the ratio is within a predetermined range.

4. The touch sensing method of claim 3, wherein the predetermined range of the ratio is between 1:2.5 to 1:1.5 or between 1.5:1 to 2.5:1.

5. The touch sensing method of claim 1, wherein in step c), the status signal is generated further based on a number of the at least one group of the first sensor lines indicated by the first indication and a number of the at least one group of the second sensor lines indicated by the second indication.

6. The touch sensing method of claim 1, further comprising:
   d) generating a control signal at least based on the status signal.

7. The touch sensing method of claim 6, wherein in step d), the control signal complies with a communication protocol used by a mouse to communicate with a host.

8. The touch sensing method of claim 1, further comprising:
- e) repeating steps a) to c) to generate a series of status signals; and
- f) generating a control signal based on a comparison result determined by comparing with one another at least two consecutive ones of the status signals.

9. The touch sensing method of claim 1, wherein in step a), the scan of each of the first sensor lines generates a first scan data, and the scan of each of the second sensor lines generates a second scan data, and in step b), the first indication is generated based on comparison results each determined by comparing a respective one of the first scan data with a predetermined threshold value, and the second indication is generated based on comparison results each determined by comparing a respective one of the second scan data with the predetermined threshold value.

10. The touch sensing method of claim 1, wherein in step a), the scan of each of the first sensor lines generates a first scan data, and the scan of each of the second sensor lines generates a second scan data, and in step b), the first indication is generated based on comparison results each determined by comparing a respective one of the first scan data with a predetermined first threshold value, and the second indication is generated based on comparison results each determined by comparing a respective one of the second scan data with a predetermined second threshold value different from the predetermined first threshold value.

11. An electronic device comprising:
- a touch sensor board including a plurality of first and second sensor lines, said first sensor lines and said second sensor lines being aligned in two different directions, respectively;
- a scanning circuit coupled electrically to said touch sensor board and configured to scan said first and second sensor lines to generate scan results; and
- an analyzing unit configured to generate first and second indications based on the scan results of said scanning circuit, the first indication carrying information of at least one group of the first sensor lines that are adjacent to one another on the touch sensor board and that have detected a user's touch on the touch sensor board and of a number of the first sensor lines of the group, the second indication carrying information of at least one group of the second sensor lines that are adjacent to one another on the touch sensor board and that have detected the user's touch on the touch sensor board and of a number of the second sensor lines of the group; said analyzing unit being further configured to generate a status signal that corresponds to a predetermined finger gesture at least based on a comparison result determined by comparing the number of the first sensor lines adjacent to one another detected simultaneously as indicated by the first indication with the number of the second sensor lines adjacent to one another detected simultaneously as indicated by the second indication.

12. The electronic device of claim 11, wherein said analyzing unit is configured to generate the status signal further based on a ratio of the number of the first sensor lines adjacent to one another detected simultaneously as indicated by the first indication to the number of the second sensor lines adjacent to one another detected simultaneously as indicated by the second indication when the comparison result shows that the two numbers are not equal.

13. The electronic device of claim 12, wherein said analyzing unit is configured to generate the status signal based on whether the ratio is within a predetermined range.

14. The electronic device of claim 13, wherein the predetermined range of the ratio is between 1:2.5 to 1:1.5 or between 1.5:1 to 2.5:1.

15. The electronic device of claim 11, wherein said analyzing unit is configured to generate the status signal further based on a number of the at least one group of the first sensor lines indicated by the first indication and a number of the at least one group of the second sensor lines indicated by the second indication.

16. The electronic device of claim 10, further comprising:
- a converting unit configured to generate a control signal at least based on the status signal.

17. The electronic device of claim 16, wherein the control signal complies with a communication protocol used by a mouse to communicate with a host.

* * * * *